United States Patent [19]

Wallin

[11] 4,034,375

[45] July 5, 1977

[54] LAMINATED CAMOUFLAGE MATERIAL

[75] Inventor: Erik W. Wallin, Gamleby, Sweden

[73] Assignee: Barracudaverken Aktiebolag, Djursholm, Sweden

[22] Filed: May 23, 1975

[21] Appl. No.: 580,403

[52] U.S. Cl. .......................... 343/18 A; 343/18 B; 428/110; 428/113; 428/232; 428/256; 428/294; 428/303; 428/919; 428/922

[51] Int. Cl.² ...................... G01V 1/40; B32B 5/12

[58] Field of Search .......... 428/110, 112, 113, 114, 428/232, 255, 256, 294, 296, 303, 919, 922; 343/18 A, 18 B

[56] References Cited

UNITED STATES PATENTS

| | | | |
|---|---|---|---|
| 1,679,721 | 8/1928 | Howard | 428/110 |
| 3,199,547 | 8/1965 | Knutson et al. | 428/255 |
| 3,427,619 | 2/1969 | Wesch et al. | 343/18 A |
| 3,629,047 | 12/1971 | Davison | 428/110 |
| 3,746,573 | 7/1973 | Hotta et al. | 428/922 |
| Re. 27,544 | 1/1973 | Bramley et al. | 428/922 |

FOREIGN PATENTS OR APPLICATIONS

| | | | |
|---|---|---|---|
| 776,158 | 6/1957 | United Kingdom | 343/18 A |

*Primary Examiner*—George F. Lesmes

*Assistant Examiner*—William R. Dixon, Jr.

*Attorney, Agent, or Firm*—Roylance, Abrams, Berdo & Kaul

[57] ABSTRACT

A flexible camouflage base material includes three layers, one being a layer of non-woven, flexible, electrically nonconductive polymeric material, a second layer of substantially identical material, and a third layer lying between the first two, the third layer having two sets of strands, the first and second layers being bonded to the third layer and to each other through openings in the third layer. The third layer includes a first array of strands spun from polyamide or polyester fibers and electrically conductive fibers, such as stainless steel or graphite, the strands being arranged in parallel relationship with each other and lying in a plane parallel to the first and second layer. The third layer also includes an adjacent array of strands of the same nature as the first array, the strands of the second array being disposed at an angle to the first to form a plurality of parallelogram-shaped openings. The larger angles of the parrallelograms thus formed are between about 100° and about 105° and the smaller angles of the parallelograms are between about 80° and about 75°. The electrically conductive fibers form about 2 to 10 percent of the spun strands, by weight.

5 Claims, 6 Drawing Figures

LAMINATED CAMOUFLAGE MATERIAL

This invention relates to camouflage material and particularly to a flexible base web for radar defeating camouflage.

Camouflage material which is presently being produced for military use, particularly in the United States, has been developed to the stage at which it is capable of defeating protection devices of various types. Coatings have been developed which are capable of presenting a visual appearance closely resembling any of a number of possible environments in which the camouflage is to be used, i.e., woodland regions, snowy regions, desert areas, and the like. In any or all of these environments, it is frequently desirable to also use the camouflage to defeat detection by radar devices, this term being used to include apparatus capable of transmitting and receiving electromagnetic energy in any one of a number of wavelengths or bands, a common one of such bands being a 3 centimeter wavelength.

If the material to be developed into camouflage is to be radar defeating, a common practice is to provide a substrate with a plurality of electrically conductive fibers or fibrils, these being either metal, such as stainless steel, or elemental carbon in the form of graphite fibers. A common material now being used includes a spun-bonded, non-woven fabric onto one surface of which has been adhered a plurality of randomly oriented metal fibrils. The non-woven fabric with the fibrils attached is then coated or laminated, usually on both sides, with a film or layer of a polymeric material, commonly polyvinyl chloride. The polyvinyl chloride (PVC) itself may be impregnated or filled with pigment to impart to the resulting material the desired responses in the visible and near visible electromagnetic radiation spectra, particularly visible, infrared and ultraviolet regions. Alternatively, the polyvinyl chloride can be further coated with a pigment-containing coating or paint to achieve a desired optical response characteristics.

While the resulting product is generally suitable, certain disadvantages have appeared. One of these is that the radar reflectance characteristics initially built into the camouflage material by virtue of the random disposition of metal fibers has a tendency to change when the finished camouflage material is handled, crinkled, folded, or otherwise flexed in normal usage. The reason for this change in radar characteristics is not fully understood, but it has been established that different characteristics appear in the vicinity of the folds and that, as a result, the camouflage can be distinguished by suitable radar analysis from the surrounding environment.

Accordingly, it is an object of the present invention to provide a base material for use in camouflage material which is flexible and which retains its radar defeating capabilities after being flexed and folded.

Briefly described, the invention includes a flexible web having radar defeating characteristics for use in camouflage material comprising first and second non-woven flexible layers of electrically nonconductive polymeric material, and a third layer lying between said first and second layers, the third layer comprising a first plurality of electrically conductive fiber-containing strands arranged in parallel, irregularly spaced, relationship with each other and lying in a plane essentially parallel to the first and second layers, and a second plurality of electrically conductive fiber-containing strands arranged in parallel, irregularly spaced relationship with each other and lying in a plane parallel to the first and second layers, the sets of strands in the third layer being disposed to form a plurality of parallelogram-shaped openings, the first and second layers being bonded to the third layer and to each other through the openings.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
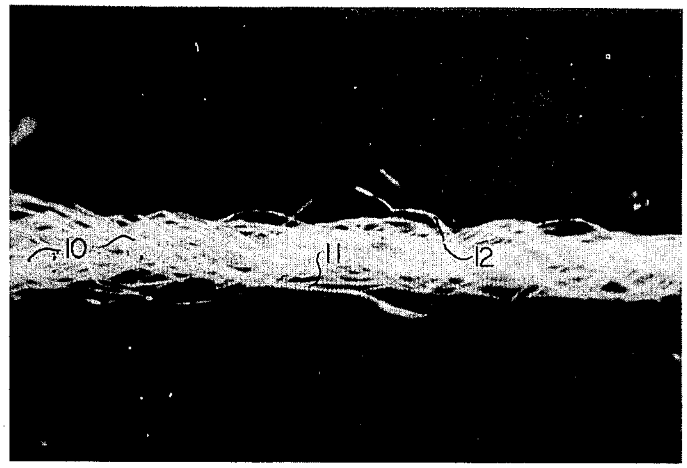
FIG. 1 is a photographic representation of a yarn strand used in the present invention.

FIG. 1 is a microscope photograph of a single yarn strand used in forming the present invention. The strand 10 is spun using a plurality of polyamide or polyester fibers, which are cut in relatively short lengths before spinning. The strand also includes a plurality of electrically conductive fibers 11 and 12 which are also cut into lengths so as to be discontinuous throughout the yarn. It will be observed that electrically conductive fibers 11 and 12 are not generally in contact with each other, but, instead, lie in various relationships with respect to the yarn strand throughout its length. The electrically conductive metal or graphite fibers have a diameter between about 0.008 millimeters and 0.02 millimeters and a length between about 50 millimeters and about 90 millimeters, although the preferred range of length is between about 60 and about 80 millimeters.

Figure 2:
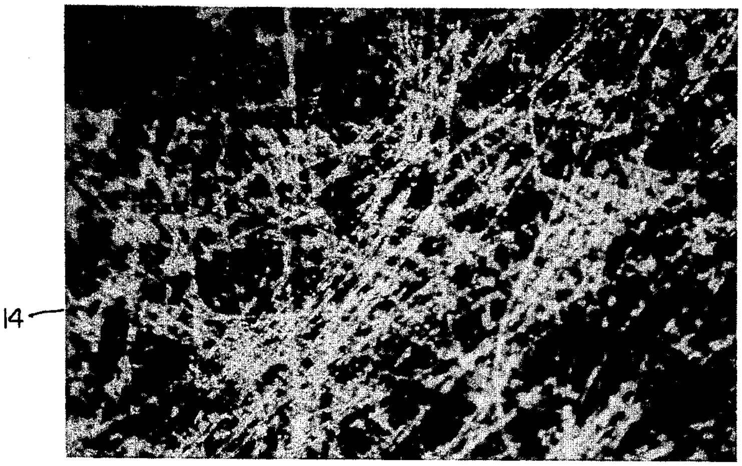
FIG. 2 is a photographic representation of a portion of the material used in forming the first and second layers of the present invention.

FIG. 2 is a photographic representation of a layer of spun-bonded material which comprises a plurality of strands of polyester material such as nylon, the fibers being arrayed and bonded into a sheet having a weight of about 0.5 – 0.8 ounces per square yard, or about 17 – 27 grams per square meter. This spun-bonded material is substantially identical to the material presently being used for a radar camouflage material base fabric, as known under the trademark CEREX, a trademark of the Monsanto Chemical Company of St. Louis, Mo.

Figure 3:
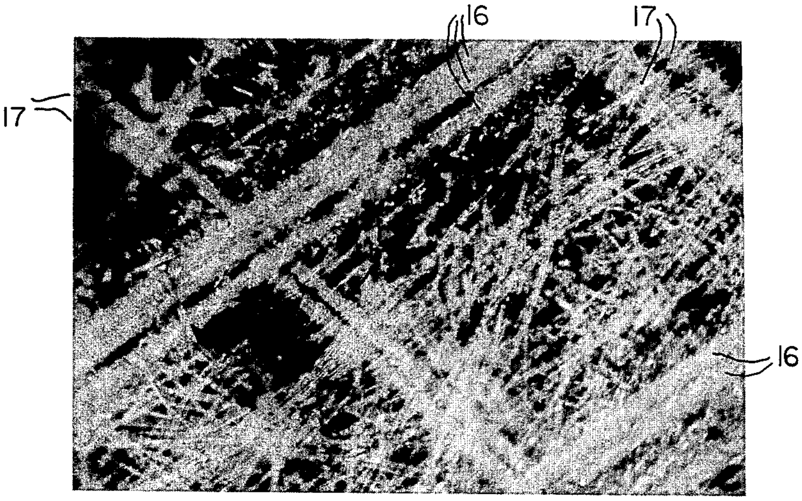
FIG. 3 is a photographic representation of the laminated structure of the present invention.
Figure 4:
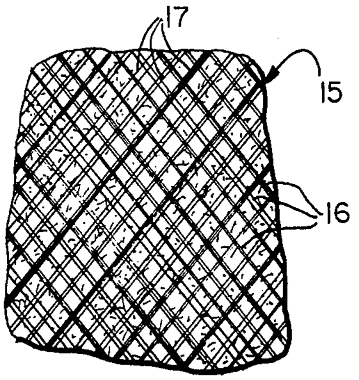
FIG. 4 is a plan view of a flexible web according to the present invention.

To produce the fabric of the present invention, a layer of the material shown in FIG. 2 is provided and a plurality of strands of material such as shown in FIG. 1 are laid in parallel relationship diagonally across the length of the sheet of CEREX material. A second array of strands of material 10 are then laid in parallel relationship with each other on the first layer of strands so that the angular relationship between the two parallel sets of arrays define a plurality of parallelogram-shaped or diamond-shaped openings and a second layer of CEREX material is placed on top of the strands. A three-layer laminate is thus formed and results in a fabric which is depicted in FIG. 3. As seen in FIG. 3, a plurality of strands 16 form one set or array of parallel strands and a second layer of strands 17 form the second array of the middle layer. It will be observed that the CEREX is sufficiently transparent, being a relatively loose and thin arrangement of polyamide or polyester fibers, so that the strands are visible therethrough. The parallelograms or diamond-shaped openings formed by the sets of strands have larger angles between about 100° and about 105°, these being identified as angle a in FIG. 3, while the smaller angles *b* are between about 80° and about 75°. In the example shown, the angles *a* and *b* are 103° and 77°, respectively. FIG. 4 is an illustration of a small piece of the fabric of FIG. 3, the scale in FIG. 4 being rather close to true size. As will be seen therein, the arrays including strands 16 and 17 are irregularly spaced, the density of strands being approximately 5 to 10 strands per centimeter in a direction perpendicular to the direction of the strands. While the irregular spacing is not necessary, this characteristic of the specific example shown in pointed out to evidence the fact that regular spacing is not essential.

Figure 5:
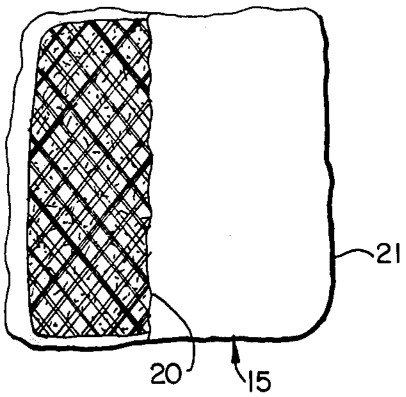
FIG. 5 is a plan view of the web of FIG. 4 with coating layers applied thereto.
Figure 6:
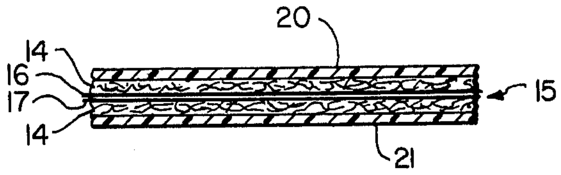
FIG. 6 is an elevation, in section, of the material of FIG. 5.

The fabric shown in FIG. 4 can be provided with suitable coatings, as illutrated in FIGS. 5 and 6, to form a completed camouflage material. In FIGS. 5 and 6, the fabric is laminated or coated on both of its major surfaces by coatings 20 and 21, thus forming a five-layer laminate. Coatings 20 and 21 can be separately formed from polyvinyl chloride, for example, by casting a polyvinyl chloride plastisol onto a release web and thermally curing the polyvinyl chloride into a film. Two films thus formed, still on the release web, are laminated onto the opposite major surfaces of web 15 by thermal bonding. This is accomplished by running each polyvinyl chloride film, still on the release web, into flush engagement with web 15 and applying sufficient heat to bring the polyvinyl chloride to the fusion point and sufficient pressure to assure a uniform bond. After the polyvinyl chloride films have been attached to the opposite major surfaces of web 15, the laminate is cooled and the release webs are stripped from the polyvinyl chloride films, leaving films 20 and 21 firmly adhered to the opposite surfaces of web 15.

The polyvinyl chloride films can contain suitable pigments to obtain the desired color characteristics and other optical characteristics, depending upon the environment in which the resulting camouflage is to be used.

While one advantageous embodiment has been chosen to illustrate the invention, it will be understood by those skilled in the art that various changes and modifications can be made without departing from the scope of the invention as defined in the appended claims.

What is claimed is:

1. A flexible web having radar defeating characteristics for use in camouflage material comprising: a first non-woven, flexible layer of electrically nonconductive polymeric material; a second non-woven, flexible material of electrically non-conductive polymeric material; and a third layer lying between said first and second layers for imparting partial radar reflective characteristics to said web, said third layer comprising a first plurality of strands containing electrically conductive fibers in generally discontinuous relationship, said strands arranged in parallel irregularly spaced relationship with each other and lying in a plane parallel to said first and second layers, a second plurality of strands identical to said first strands arranged in parallel irregularly spaced relationship with each other and lying in a plane parallel to said first and second layers, said sets of strands in said third layer being disposed to form a plurality of parallelogram-shaped openings;

said first and second layers being bonded to said third layer and to each other through said openings.

2. A web according to claim 1 wherein said strands in said third layer are angularly disposed relative to each other to form parallelogram-shaped openings having included angles the larger of which are between about 100° and about 105° and the smaller of which are between about 80° and about 75°.

3. A web according to claim 1 wherein each of said strands comprises a spun yarn strand including a plurality of polymeric threads, said electrically conductive fibers being a plurality of metal fibers, the ratio of metal fibers to polymeric threads being between about 0.05 and about 0.15, by weight.

4. A web according to claim 3 wherein said metal fibers are stainless steel, said fibers having an average diameter between about 0.008 millimeters and about 0.02 millimeters.

5. A web according to claim 1 wherein the electrically conductive fibers in said strands are fibers of graphite.

* * * * *